United States Patent [19]

Defuans

[11] 4,265,523

[45] May 5, 1981

[54] UNDERWATER STILL CAMERA

[75] Inventor: Jean-Louis Defuans, Meylan, France

[73] Assignee: Formaplex S.A., Meylan, France

[21] Appl. No.: 153,874

[22] Filed: May 28, 1980

[30] Foreign Application Priority Data

Jun. 7, 1979 [FR] France ................................ 79 14536

[51] Int. Cl.³ ...................... G03B 11/08; G03B 19/04; G03B 17/36

[52] U.S. Cl. ...................................... 354/64; 354/213; 354/217

[58] Field of Search ................... 354/64, 288, 212–218

[56] References Cited

U.S. PATENT DOCUMENTS

| 2,356,284 | 8/1944 | Stockdale | 354/216 |
| 2,879,704 | 3/1959 | Winkler et al. | 354/213 |
| 3,797,027 | 3/1974 | Sakagami | 354/213 X |
| 4,100,553 | 7/1978 | Danel | 354/64 |

FOREIGN PATENT DOCUMENTS

| 862823 | 12/1940 | France | 354/212 |
| 874356 | 8/1961 | United Kingdom | 354/215 |

Primary Examiner—Donald A. Griffin
Attorney, Agent, or Firm—Charles E. Brown

[57] ABSTRACT

An underwater still camera is disclosed having a watertight body with a back-loadable light-tight chamber, a lens, a shutter, a cocking lever for bringing the shutter to its cocked position, a push rod for releasing the shutter. Preferably the shutter, the cocking lever and push rod are all disposed outside the camera body. A retaining pawl is slidably and pivotally mounted inside the camera body and is cooperable with a toothed wheel carried by the transport spindle for blocking the rotation thereof under the control of a rotatably mounted intermediate spindle carrying sprockets engageable with perforation carried by a film and at least one stop or ratchet tooth cooperable with the retaining pawl. This arrangement permits use of a single film cartridge in an underwater camera originally adapted to receive a film pack.

13 Claims, 13 Drawing Figures

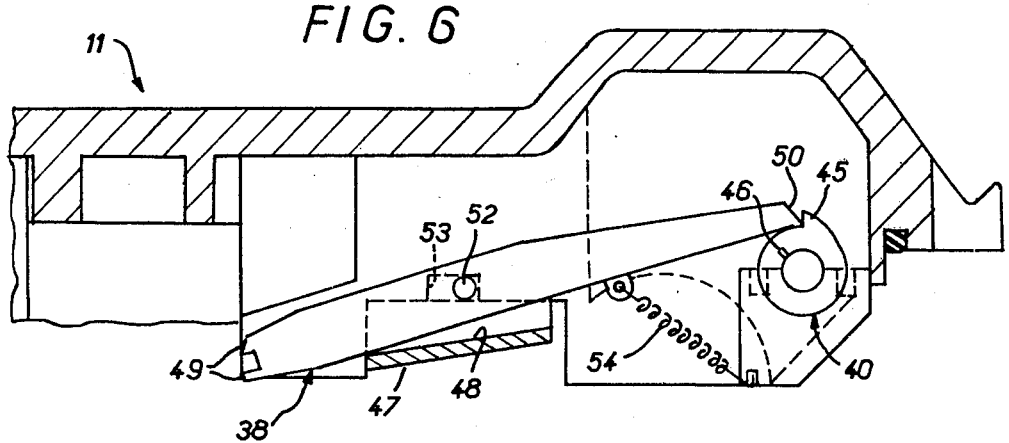
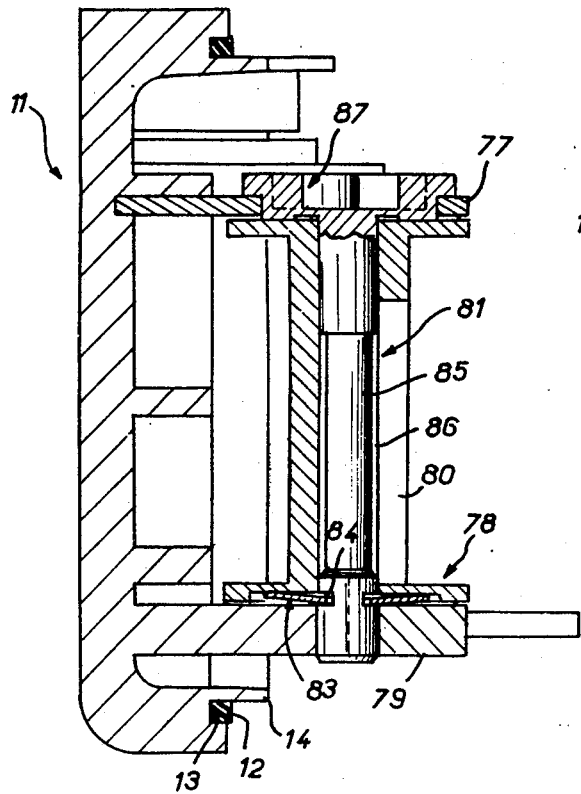
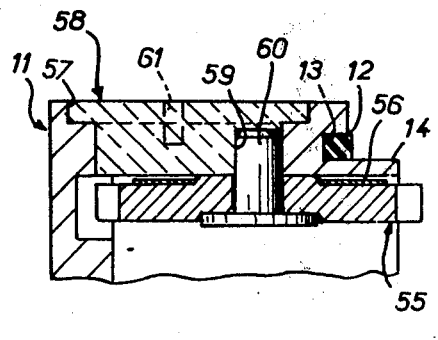
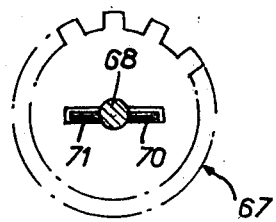

UNDERWATER STILL CAMERA

FIELD OF THE INVENTION

The present invention relates to an underwater "still" camera, and more particularly though not necessarily of the type in which the diaphragm is located in front of the lens and therefore in direct contact with the water when the camera is immersed in water.

BACKGROUND OF THE INVENTION

Such an underwater still camera is disclosed in U.S. Pat. No. 4,100,553, issued to the assignee of the present application, and comprises a watertight camera body which defines a light-tight chamber adapted to be back loaded, a lens which closes the front of the light-tight chamber and is entirely disposed outside the camera body, a shutter which is adapted to selectively cover and uncover the lens, a cocking lever which is adapted to displace the shutter to its cocked position, and a shutter release push rod which is adapted to release the shutter.

The above-mentioned U.S. patent further discloses a practical arrangement of the underwater still camera especially adapted to receive a film pack and not a single film spool or cartridge, which pack comprises in a unit not only the supply spool but also the takeup spool.

In such a still camera the camera body includes a body member and a bottom wall removably mounted thereon, and the body member is traversed by only a single transport spindle, for transporting the film.

For this purpose the transport spindle is provided with axially resiliently releasable claw means engageable with complementary claw means provided in the usual manner on the takeup spool of the pack, and an operating member, in practice a knurled head adapted to maneuver it.

Advantageously such an operating member also serves to cock the camera, in one direction of rotation it transports the film and in the opposite direction of rotation it cocks the camera, one-way rotational coupling means being provided for this purpose between the transport spindle and a cocking arm adapted to actuate the cocking lever.

It is important for the transport spindle to be held against motion in the direction of rotation corresponding to the transport of the film when the film has been transported one frame.

Accordingly the transport spindle carries crosswise inside the camera body a toothed wheel and in the body member is provided a retaining pawl which is slidably and pivotally mounted and which has at least one tooth adapted to arrestingly engage the toothed wheel under the control of means responsive to transport of the film.

In practice, in the embodiment described in the above-mentioned U.S. patent, the retaining pawl is lodged in the body member of the camera itself. The means responsive to the transport of the film comprise a tooth on the retaining pawl adapted to engage in one of the perforations which are usually provided along the longitudinal edges of such a film.

Driven by the film in the course of its transport, the retaining pawl arrests the toothed wheel of the transport spindle and therefore the transport spindle and during reverse rotation of the transport spindle for cocking the camera, the toothed wheel of the transport spindle drives the retaining pawl so that the corresponding tooth thereon is shifted into position facing another perforation of the film.

SUMMARY OF THE INVENTION

An object of the present invention is the adaptation of these arrangements for loading the camera with a single film supply spool or cartridge, and not a pack including both a takeup and a supply spool.

According to the invention there is provided a still camera of the type including a watertight body having an interior light-tight chamber adapted to be back-loaded with a film, a lens which closes off the front end of the light-tight chamber, a shutter adapted to selectively cover or uncover the lens, a cocking lever for causing the shutter to move to its cocked position, a shutter release push rod adapted to release the shutter, the shutter, the cocking lever, and the shutter release button all being disposed outside the camera body, the camera body comprising a body member sealingly traversed by a transport spindle, and a bottom wall removably mounted on the body member and comprising inside the body member a retaining pawl which is slidingly and pivotally mounted and has at least one tooth adapted to arrestingly cooperate with a ratchet wheel carried by the transport spindle under the control of means responsive to the transport of the film. The still camera is characterized in that, for adaptation to a single supply spool film, the means responsive to the film transport comprise a rotatably mounted intermediate shaft carrying at least one sprocket adapted to engage the perforations of a film and at least one ratchet tooth adapted to cooperate with the retaining pawl.

Preferably, the intermediate spindle is carried by the bottom wall of the camera body which is not only the case for the retaining pawl but also for the mounting or locating pin for receiving the takeup spool and the rewind spindle for controlling the rotation of a takeup spool under the control of the transport spindle.

Thus the bottom wall of the camera body which is removably mounted on the body member carries all the necessary parts for adapting such a still camera to a single supply film spool or cartridge.

Accordingly such a bottom wall may be suitable for not only equipping a still camera according to the invention but also for equipping preexisting viewer devices in conformity with the arrangements disclosed in the above identified U.S. Pat. No. 4,100,553 incorporated herein by reference. It suffices to change the bottom wall of the camera body of such a camera, aside for minor details easy to carry out, such as the withdrawal of the initial retaining pawl provided in the camera body and the application of a film guide at the end of a passageway or tunnel which defines the light-tight chamber of the camera.

Accordingly to another object of the invention the bottom wall of the camera body is also adapted to equip other preexisting body members of cameras.

BRIEF DESCRIPTION OF THE DRAWINGS

These and other features, advantages and objects will be brought out in the description which follows, given by way of example, with reference to the accompanying schematic drawings:

FIGS. 5, 6, 7 and 8 are enlarged fragmentary cross-sectional views of the bottom wall of the camera body, taken respectively on lines V—V, VI—VI, VII—VII and VIII—VIII in FIG. 3;

FIG. 9 is another fragmentary cross-sectional view of the bottom wall of the camera body, taken on line IX—IX in FIG. 5;

DETAILED DESCRIPTION OF THE PREFERRED EMBODIMENT

Figure 1:
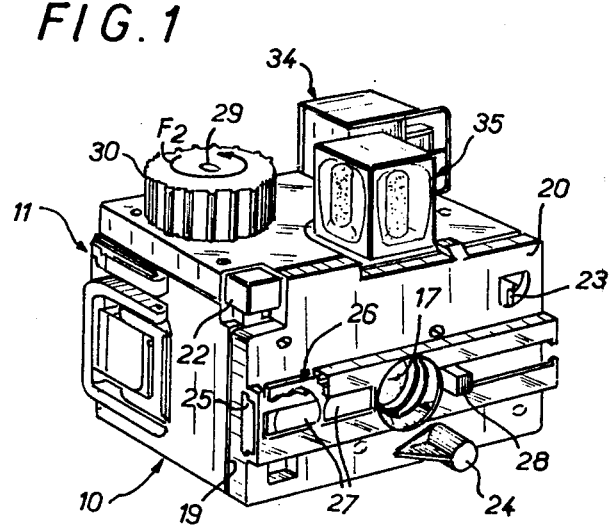
FIG. 1 is a perspective front view of a still camera embodying the invention.

In the drawings the still camera of the type disclosed in the above mentioned U.S. Pat. No. 4,100,553 is shown.

Figure 3:
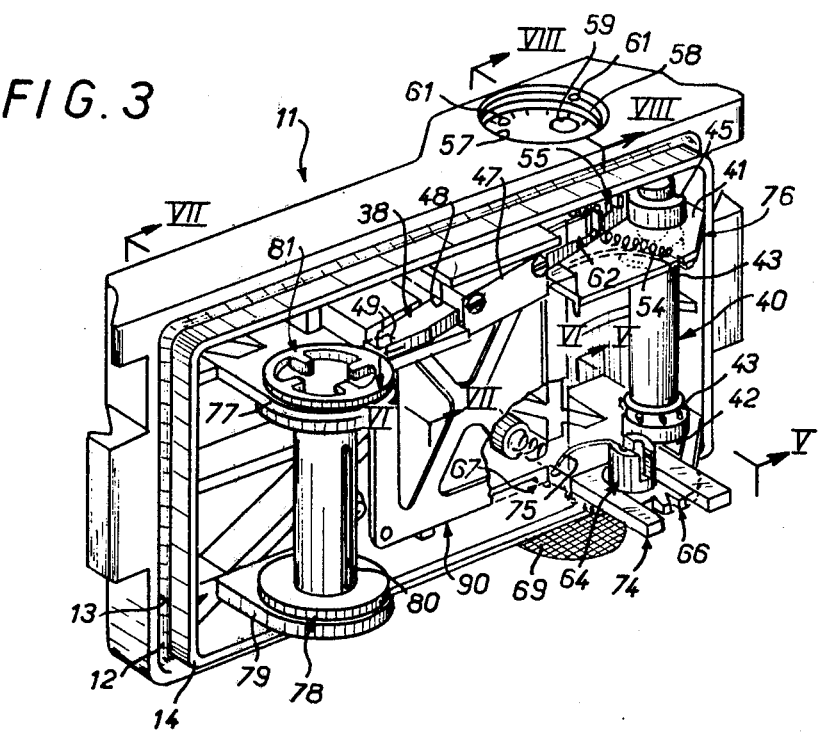
FIG. 3 is an enlarged front perspective view of the bottom wall on its own.
Figure 5:
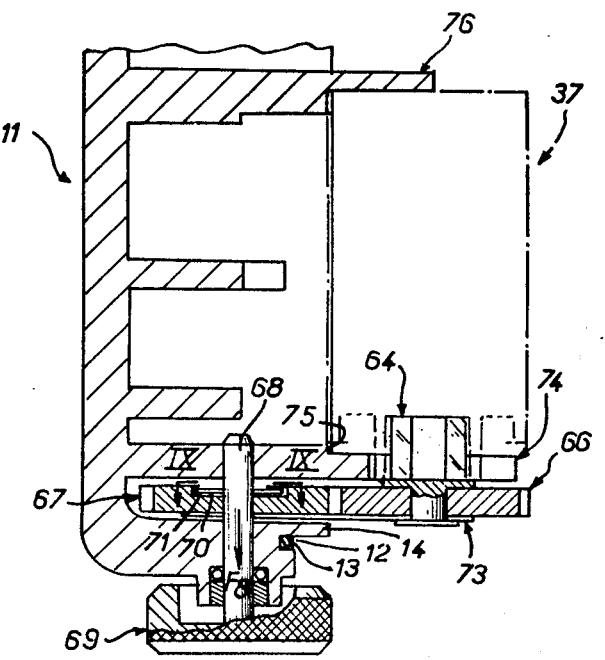

A still camera comprises a generally rectangular or more precisely parallelepipedic camera body including a bottom wall 11 adapted to be removably mounted on the body member 10, the watertightness of the corresponding mounting being assured by a sealing member 12 lodged in a groove 13 in the bottom wall 11 see FIGS. 3, 5 and 8. In the illustrated embodiment the groove is formed at the connecting zone of a flange 14 with the bottom wall 11, the flange 14 being adapted to nest inside the camera body 10.

As described in the above mentioned U.S. Pat. No. 4,100,553 the body member 10 defines an interior light-tight chamber 15 which is adapted to back-load film 16 and is closed at its front end by a lens 17.

The outside of the body member 10 between its front wall 20 and the protective flange 18 thereon, is provided with a shutter which is adapted to selectively cover and uncover the lens 17, which obviously may consist of more than one element, a cocking lever which is adapted to put the shutter in its cocked position, and a shutter release push rod which is adapted to release the shutter. Thus the shutter, the cocking lever and the shutter release rod are all preferably disposed on the outside of the body member 10 in accordance with the disclosure of the above identified U.S. patent.

The various details of the U.S. Pat. No. 4,100,553 will not be described in detail herein. Indeed for the sake of clarity FIG. 1 does not show the shutter, the cocking lever or the shutter release rod. On the other hand FIG. 1 shows the shutter release button 22, the lever for adjusting the shutter speed, a diaphragm adjusting the lever 24 which as described in U.S. Pat. No. 4,100,553 comprises a simple pull knob and the lever 24 having a lug engaged in a curved slot in the pull knob is adapted to control the displacement of the pull knob.

In the illustrated embodiment, the protective cover 20 also carries in a guideway 25 a slider 26 equipped with lens elements 27 and laterally displaceable relative to the lens 17 by the projecting knob 28 adapted to be slid by the operator.

As described in the above mentioned U.S. Pat. No. 4,100,553 the camera body 10 is sealingly traversed by a transport spindle 29 which outside the camera body carries for its control a knurled knob 30 and which inside the camera body 10 carries a toothed wheel 31 and axially resiliently releasable dog clutch means 32. By one-way rotational coupling means a cocking arm, not shown, is associated with a transport spindle 29 for controlling the cocking lever.

All the details of the above mentioned parts with the exception of the slider 26 carrying the extra lens elements 27 are disclosed in the above mentioned U.S. Pat. No. 4,100,553.

The same is true of the two lateral attachments or clamps 33 which permit the bottom wall 11 to be secured to the body member 10, as well as the various other members provided on the body member 10 such as the viewfinder 34, flash cube 35 and operating means therefor.

The present invention relates more particularly to the adaptation of the present still camera to the case where the film 16 to be loaded in the camera is wound on a single supply spool or cartridge 37, i.e., a supply spool which is not associated in a single pack with its own takeup spool.

According to the invention a retaining pawl 38, FIG. 3, associated with the toothed wheel 31 of the transport spindle 29 for blocking the transport spindle after the film has been transported one frame by means responsive to such film transport action, the means responsive to film transport comprising a rotatably mounted intermediate spindle 40.

In the illustrated embodiment the intermediate spindle 40 is carried on the bottom wall 11 adjacent and parallel to one of the lateral sides thereof, between two bearings 41 and 42.

Figure 4:
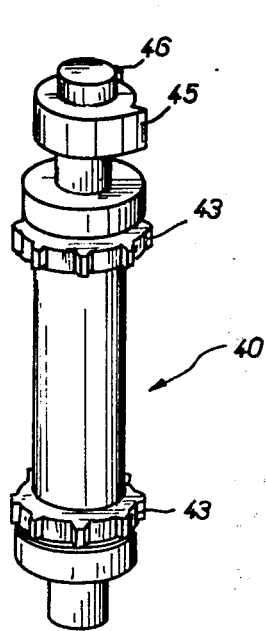
FIG. 4 is a perspective view of the intermediate spindle equipping the bottom wall of the camera body, taken on its own.

As is best seen in FIG. 4, the intermediate spindle 40 carries spaced sprockets 43 adapted to mesh with the perforations disposed along the longitudinal edges of a film 16 and having a small number of teeth, e.g. eight.

The intermediate spindle 40 also comprises at one end a stop tooth 45 of the ratchet tooth type adapted to cooperate, as will appear hereinbelow, with the retaining pawl 38, and a radially protruding lug 46 adapted to control an exposure counter as will be explained hereinbelow.

In the illustrated embodiment the retaining pawl 38 is carried on the bottom wall 11 which is provided with a guide block 47 having a guideway 48 receiving the retaining pawl 38 therein.

In practice, in the illustrated embodiment, the retaining pawl 38 is formed as an elongate bar extending generally parallel to the upper and lower edges of the bottom wall 11. One of the ends of the bar has two teeth 49 adapted to block the toothed wheel 31 on the transport spindle 29 whereas the other end has an inclined edge 50, FIG. 6, adapted to cooperate with the stop tooth or ratchet tooth 45 on the intermediate spindle 40.

The retaining pawl 38 carries two trunnions 52 by which it is pivotally and slidably mounted, the trunnions 52 being received for this purpose in slots 53 in the bottom wall 11.

Finally, the retaining pawl 38 is attached to a return spring 54 which extends at an angle to urge the retaining pawl 38 toward the stop or ratchet tooth 45 on the intermediate spindle 40.

The lug 46 on the intermediate spindle 40 meshes with a rotatably mounted gear 55 defining an exposure counter, see FIGS. 3 and 8. The gear 55 carries a disc 56 with a numerical scale opposite a fixed pointer and is in alignment with an opening 57 in the bottom wall 11 closed by a transparent window 58. In the illustrated embodiment the transparent window is of cylindrical configuration and has an eccentrically located blind bore or recess 59 which serves as a pivot journal for the shaft 60 of the gear 55. Further, the transparent window 58 has two recesses 61 adapted to rotate it.

On assembly when the transparent window 58 is to be bonded in its opening 57 in the bottom wall 11 the transparent window is rotated so as to take up any play between the gear 55 and the lug 46 which meshes therewith. Preferably for a good angular positioning of the gear 55 a deformable leaf spring 62 with a dihedral end portion meshes with the teeth of the rotary gear 55, FIG. 3.

For the insertion of the film supply spool 37, the bottom wall 11 has a mounting or locating pin 64 which has a diametrical slot and is adapted to engage an end of the supply spool.

In practice the mounting or locating pin 64 is fixed to first rewind gear 66, referred to as the primary rewind gear, which meshes with a second rewind gear 67, referred to as the secondary rewind gear, adapted to cooperate with a rewind 68 sealingly traversing the bottom wall 11, see FIGS. 3 and 5.

In practice the rewind shaft 68 which extends through the secondary rewind gear 67 and carries a knurled button 69 on the outside, is axially movable between a rest position, not shown, in which it is free relative to the secondary rewind gear 67 and an operative position, shown in FIG. 5, in which it is fixed for rotation with the secondary rewind gear 67. For example, as shown, the rewind shaft 68 has a transversely extending key 70 adapted to be received in a complementary slot or keyway 71 on the surface of the secondary rewind gear 67, FIG. 9.

In the illustrated embodiment the primary rewind gear 66 is carried by a leaf spring 73 and the mounting or local pin 64 which it carries is engaged in a fixed bifurcated guide 74 fast with the bottom wall 11. A recess 75 of the contour of the supply spool is formed on the surface of the bifurcated guide 74 and also on the surface of the flange 76 extending parallel to the bifurcated guide 74 and spaced therefrom.

Figure 10:
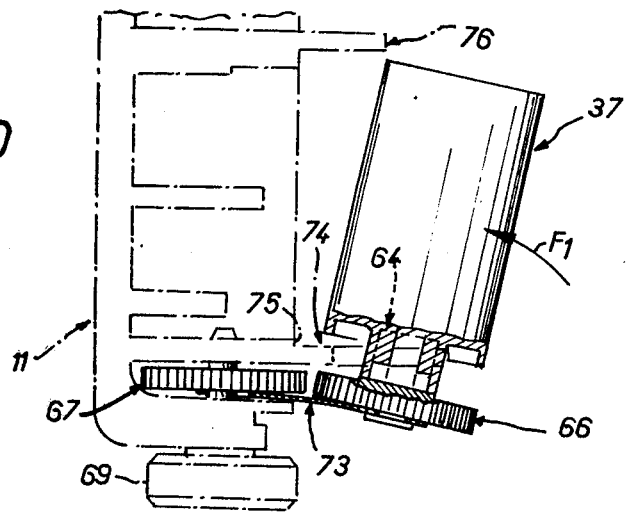
FIG. 10 is a view similar to that of FIG. 5 with parts in chain-dotted lines, illustrating the positioning of the film supply spool or cartridge into place.

As it will be readily understood, and illustrated in FIG. 10, to put the supply spool 37 into position it suffices to tilt the primary rewind gear 66 by means of the leaf spring 73 and insert the supply spool 37 on the mounting or locating pin 64; the thus-tilted primary rewind gear 66 then swings the supply spool 37 in the direction of arrow $F_1$ in FIG. 10 until its engagement with the recesses in bifurcated guide 74 and the flange 76.

Parallel to the lateral edge of the bottom wall 11 opposite the one along which the intermediate spindle 40 is located, the bottom wall 11 carries a takeup spindle 78 which is rotatably mounted on the bottom wall between the flanges 77 and 79 which define bearings, one being bonded and the other integrally molded.

The takeup spool 78 has a slot 80 which runs longitudinally along a part of its height traversed by a winder shaft 81. In practice a split spring washer 83 is fixed for rotation with the winder shaft 81 and conically deformed like a Belleville washer. The split spring washer 83 is engaged at its inner periphery in two parallel slots 84 in the winder shaft 81 and bears against one of the flanks of the slots 84 and it bears at its outer periphery against the takeup spool in frictional contact therewith. The intermediate section of the winder shaft 81 is of reduced diameter 85 defining between it and the takeup spool 78 an annular space 86 for receiving the lead end of the film 16.

Finally, outside the takeup spool 78 the rewind shaft 81 has a dog clutch means 87 adapted to cooperate with dog clutch means 32 on the transport spindle 29.

As will be noted the mounting pin 64 and the rewind shaft 81 are offset parallel to the axis of the lens 17 to protrude inside the body member 10.

Finally, the bottom wall 11 has a spring mounted film press 90 associated with a film guide 91 mounted at the end of the narrow side of the tunnel defined by the light-tight chamber 15 and suitably secured thereto, by bonding, screws or a clip mounting.

During the loading of the camera and after the fresh film spool or cartridge 37 has been placed on the mounting pin 64 as previously explained, the film 16 is first reeved over the intermediate spindle 40, and then inserted into the slot of the winder shaft 81.

The bottom wall 11 is then secured in place on the body member 10 by means of clamping attachment members 33 thereon. Once the bottom wall 11 is in position on the body member 10, a portion of the film 16 is pressed against the film guide 91 by the film press and the dog clutch means 87 on the winder shaft 81 are automatically engaged with the dog clutch means 32 on the transport spindle 29. The camera is then ready to be used.

Figure 2:
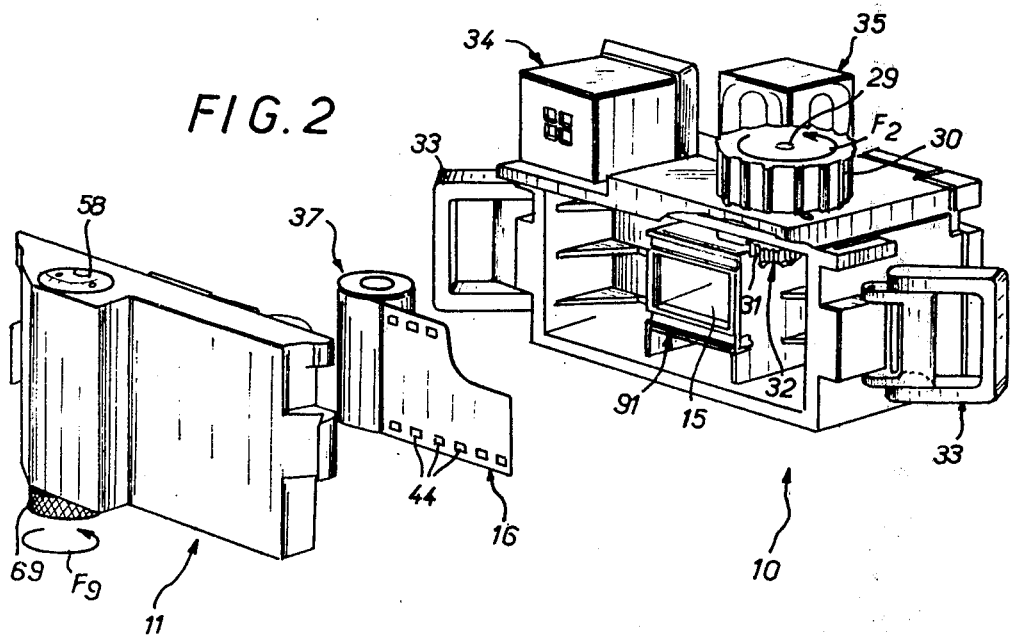
FIG. 2 is a rear perspective view with portions cutaway and the removable bottom wall of the camera body removed.
Figure 11A:
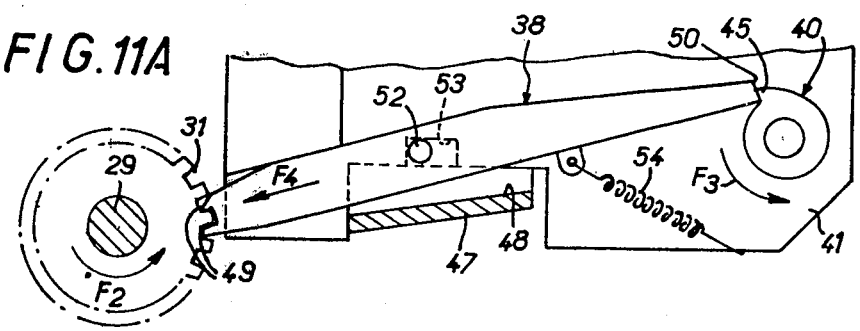
FIGS. 11A, 11B and 11C are views similar to FIG. 6 and illustrate various operating stages of the retaining pawl shown in FIG. 6.

To transport the film 16 one frame, the transport spindle 29 just has to be turned in the direction of arrow $F_2$ in FIGS. 1, 2 and 11A by means of the knurled control knob 30 on the transport spindle. In the course of the rotation of the transport spindle 29 the winder shaft 81 is coupled to the former by means of the dog clutch means 32 and 87. Moreover, in this direction of rotation of the transport spindle 29, the takeup spool 78 is fixed for rotation with the winder shaft 81 by the spring washer 83 which acts as a friction clutch. Accordingly as the film 16 is reeved over the intermediate spindle 40 a portion is pulled out from the film supply spool or cartridge 37 owing to the rotational movement imparted to the transport spindle 29. Because of the sprockets 43 which engage in the perforations 44 of the film 16, the intermediate gear 40 revolves with the transport spindle 29 in the same direction as the latter, as represented by arrow $F_3$ in FIG. 11A.

This situation continues until the stop or ratchet tooth 45 of the intermediate spindle 40 comes into engagement with the inclined end 50 of the retaining pawl 38, FIG. 11A, and under the bias exerted on the retaining pawl 38, in the direction of arrow $F_4$ in FIG. 11A, the other end of the retaining pawl engages its teeth with the teeth of the toothed wheel 31 on the transport spindle 29 thereby blocking or preventing the rotation of the toothed wheel 31 and therefore the transport spindle 29.

The operator is therefore warned that the film 16 has been advanced one frame.

Figure 11B:
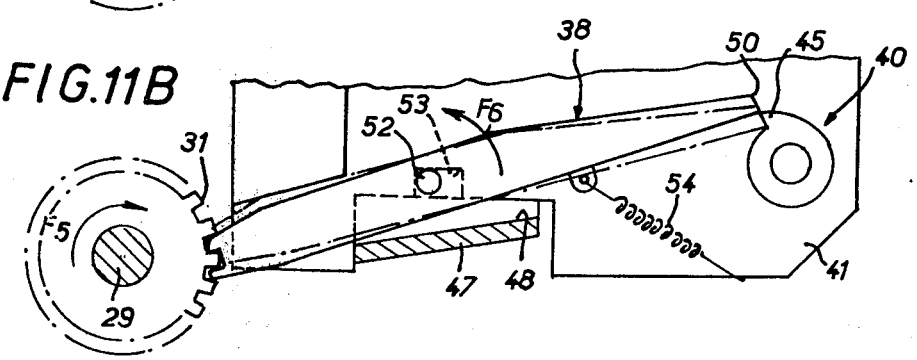

Then to cock the camera the operator assures a reverse rotation of the transport spindle 29 which is rotated again by means of the knurled control knob 30 thereon, in the direction of arrow $F_5$ in FIG. 11B.

According to the procedure described in the above-mentioned U.S. patent, the camera can then be cocked.

The operator may then take a picture by pushing the shutter release button for the shutter release push rod.

Figure 11C:
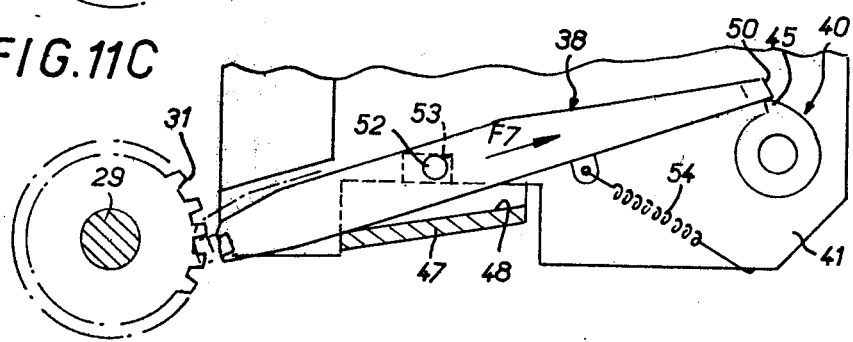

But contemporaneously, with the cocking of the camera the reverse rotation of the transport spindle 29 causes a rotation of the retaining pawl 38 in the direction of arrow $F_6$ in FIG. 11B which causes it to escape from the ratchet tooth 45 on the intermediate spindle 40. Once the retaining pawl 38 has been freed it may slide longitudinally in the direction of arrow $F_7$ in FIG. 11C under the biasing action of the return spring 54 which causes the retaining pawl to release the intermediate spindle 40 and disengage the toothed wheel 31 of the transport spindle 29.

The camera is then ready for the film 16 to be transported again to take another shot if desired.

Once the entire film 16 has been exposed to rewind it, the rewind shaft 68 merely has to be pulled downward in the direction of arrow $F_8$ in FIG. 5 by means of the knurled control knob 69 then rotated in the direction of arrow $F_9$ in FIG. 2. The film supply spool 37 is then actuated for rewinding by the rewind gears 66 and 67. During rewinding of the film the winder shaft 81 does not rotate contrary to the takeup spindle 78 and there is slipping between the members of the friction clutch defined by the spring washer 83.

The invention is, of course, not limited to the described and illustrated embodiment but may incorporate variations, modifications and alternatives without departing from the spirit and scope as defined by the appended claims.

In particular even though it is particularly advantageous for the retaining pawl 38, the mounting pin 64, the intermediate spindle and the takeup spool 78 with the winder shaft 81 to be supported on the bottom wall 11 since this arrangement permits such a bottom wall 11 to be used on the camera body of the apparatus disclosed in the aforementioned U.S. patent without other adaptation, except the elimination of the retaining pawl normally equipping the camera body of the latter and the provision of a film guide in the camera body, it is not necessarily so.

What is claimed is:

1. A "still" camera comprising a watertight body having an interior light tight chamber adapted to be back-loaded with a film, a lens closing off the front end of the light-tight chamber, a shutter adapted to selectively cover and uncover the lens, a cocking lever for bringing the shutter to its cocked position, a push rod adapted to release the shutter, the shutter, cocking lever and the push rod all being disposed outside the camera body, the camera body comprising a body member sealingly traversed by a transport spindle and a removably mounted bottom wall, a retaining pawl slidably and pivotally mounted inside the camera body and having a tooth cooperable with toothed wheel carried by the transport spindle for blocking the rotation thereof under the control of means responsive to the transport of a film, wherein the improvement comprises the means responsive to the transport of a film comprising a rotatably mounted intermediate spindle carrying at least one sprocket adapted to engage perforations of a film and at least one stop or ratchet tooth cooperable with the retaining pawl.

2. A camera according to claim 1, wherein the intermediate spindle is carried by the bottom wall of the camera.

3. A camera according to claim 1, wherein the retaining pawl is mounted on the bottom wall of the camera body, the bottom wall having a guideway for receiving the retaining pawl.

4. A camera according to claim 1, wherein the retaining pawl comprises an elongate bar having at one end teeth cooperable with the toothed wheel on the transport spindle and an inclined edge at the other end cooperable with the stop or ratchet tooth of the intermediate spindle.

5. A camera according to claim 1, wherein the intermediate spindle carries at least one lug for controlling an exposure counter.

6. A camera according to claim 5, the bottom wall having an opening sealed off by transparent window, wherein the exposure counter comprises a gear rotatably mounted in the bottom wall in alignment with the opening, the transparent window being of cylindrical contour and having a recess adapted to define a pivot journal for the shaft of the gear at an eccentric position thereon.

7. A camera according to claim 6, wherein a leaf spring engages the teeth of the gear of the exposure counter.

8. A camera according to claim 1, wherein the bottom wall of the camera body has a mounting or locating pin engageable with the film supply spool or cartridge and fixed to a primary rewind gear which meshes with a secondary rewind gear cooperable with a rewind shaft sealingly traversing the bottom wall.

9. A camera according to claim 8, wherein the rewind shaft passes through the secondary rewind gear and is axially movable between a rest position in which it is free with respect to the secondary rewind gear and an operative position in which it is fixed for rotation therewith.

10. A camera according to claim 8, wherein the primary rewind gear is carried by a deformable leaf spring, the mounting or locating pin carried by the leaf spring being engaged in a bifurcated guide fixed to the bottom wall of the camera.

11. A camera according to claim 1 or 8, the transport spindle being equipped by axially resiliently releasable dog clutch means, wherein the bottom wall of the camera body comprises a takeup spindle spool which is rotatably mounted on the bottom wall and is axially traversed by a winder shaft, a friction clutch being provided between the takeup spool and the winder shaft having outside the takeup spool dog clutch means cooperable with the dog clutch means on the transport spindle.

12. A camera according to claim 11, wherein the mounting or locating pin and the winder shaft are offset relative to the edge of the bottom wall parallel to the axis of the lens for protruding into the camera body.

13. A "still" camera comprising a watertight body having an interior light-tight chamber adapted to be back-loaded with a film, a lens closing off the front of the light-tight chamber, a shutter adapted to selectively cover and uncover the lens, a cocking lever for bringing the shutter to its cocked position, a push rod adapted to release the shutter, the camera body comprising a body member sealingly traversed by a transport spindle and a removably mounted bottom wall, a retaining pawl slidably and pivotally mounted inside the camera body and having a tooth cooperable with a toothed wheel carried by the transport spindle for blocking rotation thereof under the control of means responsive to the transport of a film, wherein the improvement comprises the means responsive to the transport of a film comprising a rotatably mounted intermediate spindle carrying at least one sprocket adapted to engage perforations of a film and at least one stop or ratchet tooth cooperable with the retaining pawl.

* * * * *